Patented Feb. 19, 1935

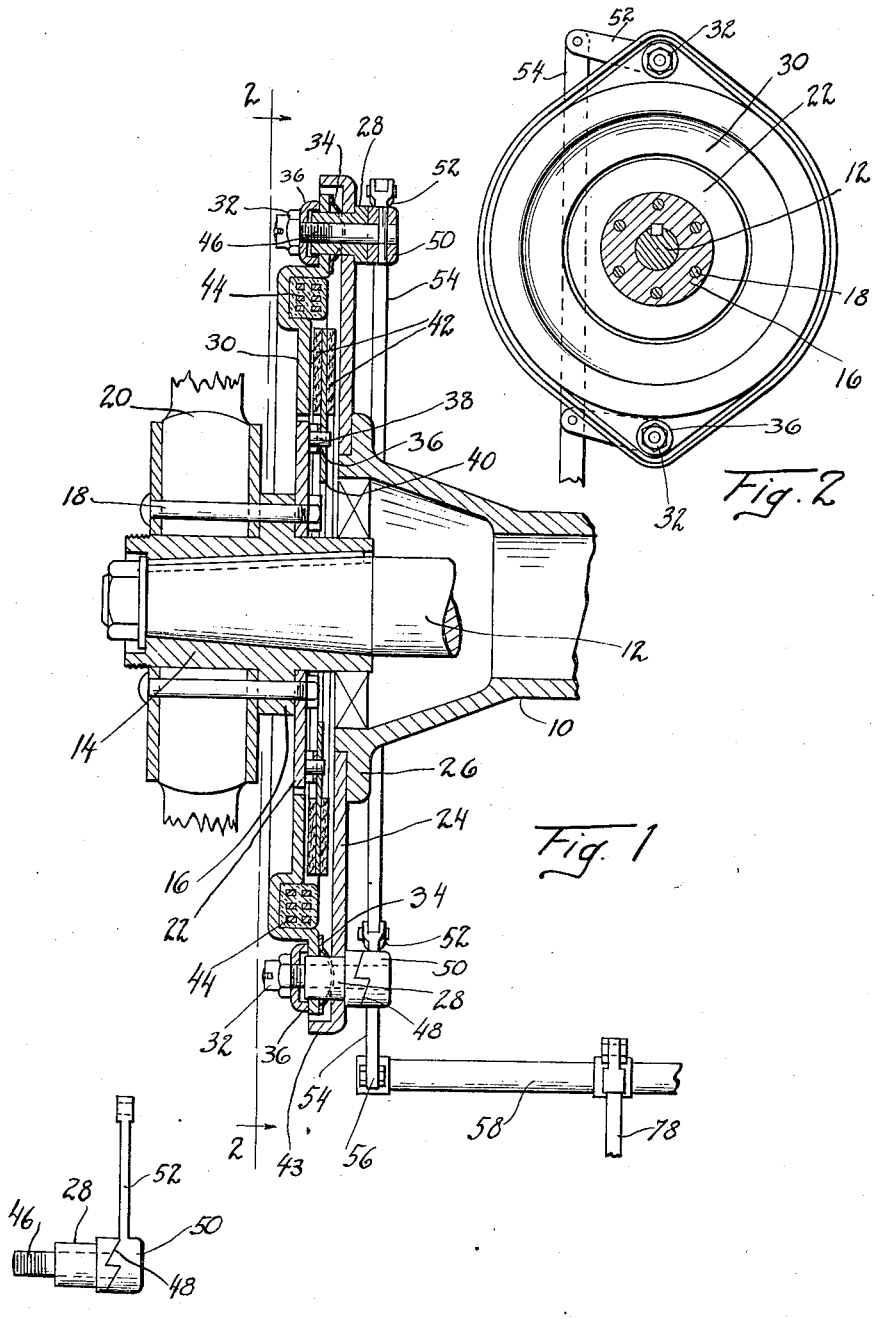

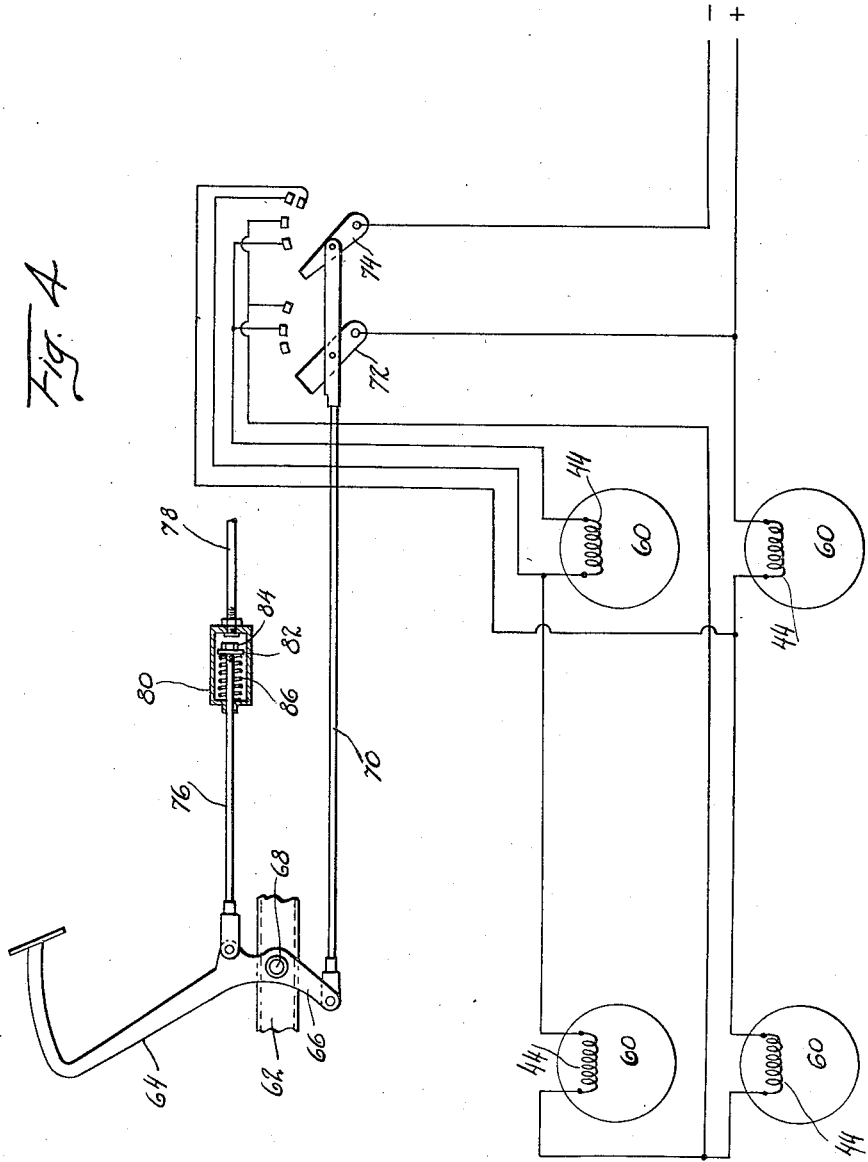

1,991,498

UNITED STATES PATENT OFFICE 1,991,498

ELECTRICAL DISK BRAKE

Adiel Y. Dodge, South Bend, Ind., assignor to Bendix Brake Company, South Bend, Ind., a corporation of Illinois Application September 12, 1930, Serial No. 481,514

9 Claims. (Cl. 188—156)

My invention relates to automotive vehicle brake systems and has particular reference to an improved magnetic disk brake assembly and means for controlling the actuation of the same in proportion with the manual effort exerted by the vehicle operator.

An object of my invention is to provide a magnetically actuated brake structure of extremely simple design comprised of relatively few parts which are easily assembled, either initially or by way of replacement, and which operates with a maximum efficiency.

Magnetic disk brakes have been utilized for the above described purpose heretofore but I propose to increase the efficiency of operation of such brakes, not only by virtue of the particular arrangement of parts involved, but by forming the magnetically actuated friction disks of alternately high and low carbon steel. This arrangement enables a certain amount of magnetism to be retained in the high carbon steel at all times, thereby producing a greater compressive force between the friction disks when only manual brake application is made, either prior to the energization of the magnetic means or in the event the electric power device is not functioning.

Another object of my invention is to so arrange the parts of the brake assembly that a completely housed structure is obtained, thereby protecting the working elements of the structure from dust and dirt.

An additional meritorious feature of my invention resides in the use of spring steel metal washers for the purpose of normally retaining the friction disks in spaced apart relation. These steel washers may be in the form of an annular steel stamping or may be comprised of a series of segments extending all around the disks. In addition these washers form a magnetic conductor to assist in closing the magnetic circuit through the friction disk. Thus the effective strength of the magnetism is still further increased for a given strength of current.

Yet another object of my invention is to provide electric control means for actuating the magnetic friction disks whereby the strength of the current in the magnet coils is directly proportioned to the manual effort exerted upon the conventional vehicle brake pedal by the operator. While securing this advantageous result I have also arranged my brake actuating mechanism in such way that should the electric system fail for any reason, the friction disks may be compressed by the manual exertion of the operator. The reverse is likewise true in that the electric mechanism alone is quite sufficient to actuate the brakes upon failure of the manual connections. When both sets of mechanism are intact the brakes are adapted to be actuated simultaneously by manual and electric effort, the one augmenting the other throughout the brake applying operation.

Various other meritorious features of my invention will be apparent from the following description taken in conjunction with the drawings wherein like numerals refer to like parts throughout the several figures and wherein:

Fig. 1 is a vertical section through my improved friction disk brake assembly,

Fig. 2 is a side elevation thereof,

Fig. 3 is a detail of the manual actuating means, and

Fig. 4 illustrates somewhat diagrammatically my improved brake circuit control mechanism.

Referring to the drawings, numeral 10 represents the axle housing in which is journalled the axle 12 and the wheel hub 14 is keyed to the said axle for rotation therewith. Secured to opposite sides of an annular flange 16 on the hub 14 by means of bolts 18 is the wheel 20 and an annular disk plate 22, which latter assists in forming an outer closure for the friction disk brake mechanism.

A backing plate 24 is secured against rotation upon the axle housing 10 against the annular flange 26. Sleeve studs 28 extend through fixed backing plate 24 at spaced apart points about its periphery and are fixedly secured by suitable means against rotation thereto, these studs being located at diametrically opposed points in the preferred form clearly illustrated in Fig. 2. Studs 28 constitute sleeves for bolts 46, which latter support an annular ring disk member 30 which is retained thereon by the nuts 32. Steel spring metal washers 34 of concavo-convex form are seated upon the intermediate portions of the studs 28 and function to retain plates 24 and 30 normally in spaced apart relation, as indicated in Fig. 1. These annular washers consist of a single stamping in the embodiment of the invention illustrated herein but it is realized a plurality of annular segments may be used if desired. An outer rigid washer 36 precludes the possibility of any chattering of the parts.

Projecting inwardly around the outer periphery of rotatable disk 22 are a plurality of studs 38 upon which are mounted a disk 40. This disk is free to slide axially along the stud for a limited distance, such movement being limited by the plates 22 and 24 respectively. This disk 40 has a friction facing 42 secured on each side of its annular periphery, which friction facing is adapted to be frictionally engaged by the disks 30 and 24 when the latter are compressed as about to be described.

Seated in an annular groove around the outer periphery of plate 30 is an electric coil 44, which coil may be continuous or consist of a plurality of segmental coil units. Upon energization of the coil 44 the disks 30 and 24 and 40 will become the armatures of an electro-magnet and the disk 30 will be forced inwardly by the magnetic flux to compress the friction facings 42 on disk 40 between itself and the inner plate disk 24.

Experiment has indicated that by providing alternately high and low carbon steel for the friction disks less wear will occur between the disks than if the steel friction disks were all of like carbon content. It has further been determined that upon utilizing steel disks of high carbon content, the magnetization is retained permanently in the steel and aids at all times in the manual application of the brake, particularly prior to the energization of the magnetic coils. For that reason I propose to form the two outer disks 24 and 30 of high carbon steel while making the central disk 40, which carries the friction facings 42, of low carbon steel. It will be noted that the ring disk 30 completes the closure for the outer end of the assembly, and likewise supports the magnet coils 44. The outer circumference of disk 24 is turned over as at 43 to form a substantially closed drum effect in which the assembly is housed against dirt. The inner face of stud 28 is provided with cam surfaces 48 adapted to engage corresponding cam surfaces on the head 50 of bolt 46. In this way rotation of the bolt head 50 will tend to force the same axially inward, thereby forcing disk 30 inwardly by means of nut 32 to compress the friction facings 42 between itself and disk 24.

The heads 50 of bolts 46 may be rotated manually through an integral arm 52 by means of linkage 54 which is connected as at 56 with a rotatable brake actuating rod 58.

For controlling the actuation of the brakes I have devised the mechanism illustrated in Fig. 4 wherein the electric brakes are diagrammatically illustrated by the numeral 60, the coils 44 thereof being likewise diagrammatically illustrated. Secured pivotally to the vehicle chassis 62 is the conventional brake pedal 64. The brake pedal has a portion 66 extending below its pivot point 68 and connected through link 70 with the switch blades 72 and 74 of any desired type of rheostat. In this way the resistance in the circuit to the brake coils 44 may be controlled as desired.

The brake rod 76 is pivotally connected to brake pedal 64 above the pivot point 68 and the opposite extremity of rod 76 is connected through another rod 78 to the brake actuating rod 58 in the following manner.

A cylindrical casing 80 is apertured at one end thereby permitting it to slidably receive the end of rod 76. The end of rod 76 is provided with an annular washer 82 secured thereon by the nut 84 and seated between this washer and the apertured end of cylinder 80 is a coil spring 86. Rod 78 is rigidly and adjustably secured in any desired manner to the opposite extremity of cylinder 80 as clearly indicated in Fig. 4.

Due to this yielding connection in the mechanical hook-up the vehicle operator may continue to apply the brakes through increased strength of the electric current after the mechanical reaction to the application of the brakes has become so great as to normally render it difficult, if not impossible, to depress the brake pedal 64 further. At the same time further depression of the brake pedal 64 continues to retain the brakes applied to a predetermined maximum through the mechanical connections while permitting further depression of pedal 64 through the yielding connection to cut out still further resistance from the circuit to the magnetic brake coils.

Various modifications of my structure may be apparent to those skilled in the art and for that reason I intend to limit myself only within the scope of the appended claims.

I claim:

1. A vehicle wheel brake mechanism comprising, in combination, a plurality of sets of interleaved friction disks, one set of disks being adapted to rotate with the wheel, another set being secured against rotation, a magnet associated with one of said disks, and manually operable means for simultaneously compressing said disks mechanically and energizing said magnet to create a magnetic flux therethrough likewise tending to compress the same.

2. Automotive vehicle wheel brake mechanism comprising, in combination, a plurality of sets of interleaved friction disks, one set of disks being adapted to rotate with a vehicle wheel, the other set being secured against rotation and manually operable means for simultaneously compressing said disks mechanically and creating a magnetic flux therethrough likewise tending to compress the same, said manually operable means including means whereby either of said simultaneously operable forces will continue to operate on disability of the other.

3. Brake mechanism comprising, in combination, a rotatable wheel, a non-rotatable axle housing, a plurality of interleaved friction disks, alternate disks being secured respectively to said wheel and said housing, spring metal washers interposed between alternate disks tending to maintain the same normally in spaced apart relation, said washers being magnetically permeable to a substantial degree, and an annular electro-magnet coil seated in an annular groove formed in one of said friction disks.

4. Brake mechanism comprising, in combination, a rotatable wheel, a non-rotatable axle housing, a plurality of interleaved friction disks, alternate disks being secured respectively to said wheel and said housing, spring metal washers interposed between alternate disks tending to maintain the same normally in spaced apart relation, said washers being magnetically permeable to a substantial degree, an annular electro-magnet coil seated in an annular groove formed in one of said friction disks, and manually operable means for simultaneously compressing said disks mechanically while closing a circuit and automatically increasing the current flow through said magnet coils.

5. Brake mechanism comprising, in combination, a rotatable wheel, a non-rotatable axle housing, a plurality of interleaved friction disks, alternate disks being secured respectively to said wheel and said housing, spring metal washers interposed between alternate disks tending to maintain the same normally in spaced apart relation, said washers being magnetically permeable to a substantial degree, an annular electro-magnet coil seated in an annular groove formed in one of said friction disks, and manually operable means for simultaneously compressing said disks mechanically while closing a circuit through and automatically increasing the current through said magnet coils, said means including means whereby the strength of the current through said coil is automatically varied in direct proportion to the manual effort applied.

6. Brake mechanism including, in combination, a rotatable wheel, a backing plate fixed with relation thereto, an annular disk secured to said wheel, including means extending around its outer periphery for slidably supporting a friction disk, a second annular disk surrounding said last mentioned disk and positioned by said backing plate for axial slidable movement with relation thereto, and a magnet coil positioned on said axially slidable disk.

7. A vehicle wheel brake mechanism comprising, in combination, a plurality of sets of interleaved friction disks, one set of disks being adapted to rotate with the wheel, another set being secured against rotation, and manual means and power means operable to simultaneously compress said disks together whereby they are frictionally engaged with one another.

8. Vehicle brake mechanism comprising, in combination, a wheel, a plurality of sets of interleaved friction disks, one set of disks being adapted to rotate with the wheel, another set being secured against rotation, a manual brake applying member operatively connected with said friction disks to compress the same together, a power device adapted upon being rendered operative to also compress the friction disks together, a variable controller for said power device operatively connected with said brake applying member whereby upon brake application of the latter the friction disks are gradually compressed together both by the manual and power operating means.

9. Vehicle brake mechanism comprising, in combination, a wheel, a friction disk adapted to rotate with said wheel, a second friction disk adjacent said first mentioned friction disk secured against rotation, manual means for urging said disks together to retard the rotation of the wheel, power means to operate in conjunction with said manual means for also urging said disks together to retard the rotation of the wheel, a manual brake control member coupled with said manual means to control the operation of the latter, a variable control device for said power means operatively connected to said manual brake control member so that upon actuation of the manual control member both the manual means and power means are rendered operative together.

ADIEL Y. DODGE.